US011865717B2

(12) United States Patent
Shin et al.

(10) Patent No.: US 11,865,717 B2
(45) Date of Patent: Jan. 9, 2024

(54) METHOD OF CONTROLLING MOVEMENT OF CART ROBOT IN RESPONSE TO CHANGE IN TRAVEL SURFACE USING ARTIFICIAL INTELLIGENCE AND CART ROBOT IMPLEMENTING THE SAME

(71) Applicant: LG ELECTRONICS INC., Seoul (KR)

(72) Inventors: Kangsoo Shin, Seoul (KR); Sunryang Kim, Seoul (KR); Yoonsik Kim, Seoul (KR); Joohan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 250 days.

(21) Appl. No.: 17/423,756

(22) PCT Filed: Apr. 8, 2019

(86) PCT No.: PCT/KR2019/004142
§ 371 (c)(1),
(2) Date: Jul. 16, 2021

(87) PCT Pub. No.: WO2020/209394
PCT Pub. Date: Oct. 15, 2020

(65) Prior Publication Data
US 2022/0118613 A1 Apr. 21, 2022

(51) Int. Cl.
*B25J 9/16* (2006.01)
*B25J 13/08* (2006.01)

(52) U.S. Cl.
CPC ............ *B25J 9/1633* (2013.01); *B25J 9/161* (2013.01); *B25J 9/1676* (2013.01); *B25J 13/085* (2013.01)

(58) Field of Classification Search
CPC ........ B25J 9/161; B25J 9/1676; B25J 13/085; B25J 11/008; B25J 19/02; B25J 9/1633; G05D 1/027; G05D 1/0016; G05D 2201/0216; B62B 3/14
See application file for complete search history.

(56) References Cited

U.S. PATENT DOCUMENTS

| 11,015,947 | B2 * | 5/2021 | Hatanaka | G01C 21/3667 |
| 2015/0271991 | A1 * | 10/2015 | Balutis | G05D 1/0011 |
| | | | | 700/264 |
| 2015/0366743 | A1 * | 12/2015 | Katayama | A61H 3/04 |
| | | | | 701/99 |

(Continued)

FOREIGN PATENT DOCUMENTS

| JP | 2002-160637 A | 6/2002 |
| KR | 10-0338531 B1 | 5/2002 |

(Continued)

*Primary Examiner* — Adam R Mott
*Assistant Examiner* — Sagar Kc
(74) *Attorney, Agent, or Firm* — Birch, Stewart, Kolasch & Birch, LLP

(57) ABSTRACT

The present disclosure relates to a method of controlling movement of a cart in response to a change in a travel surface using artificial intelligence and a cart implementing the same, and in a cart robot of one embodiment, an IMU sensor senses a change in a travel surface, and an obstacle sensor senses a distance from an installed object placed in a direction of an advance of the cart robot, to control a moving part of the cart robot.

17 Claims, 7 Drawing Sheets

(56) References Cited

U.S. PATENT DOCUMENTS

| | | | |
|---|---|---|---|
| 2016/0174459 A1* | 6/2016 | Balutis | B25J 9/1674 |
| | | | 701/25 |
| 2017/0129523 A1* | 5/2017 | Hane | B62B 5/0033 |
| 2018/0173223 A1* | 6/2018 | Doane | G05D 1/0255 |
| 2018/0341726 A1* | 11/2018 | Hatanaka | G01C 21/3667 |
| 2018/0348299 A1 | 12/2018 | High et al. | |
| 2019/0387680 A1* | 12/2019 | Jägenstedt | A01D 75/28 |

FOREIGN PATENT DOCUMENTS

| | | |
|---|---|---|
| KR | 10-2015-0128096 A | 11/2015 |
| KR | 10-2016-0039047 A | 4/2016 |
| KR | 20160039047 A * | 4/2016 |
| KR | 10-1663676 B1 | 10/2016 |
| KR | 10-1740349 B1 | 5/2017 |
| KR | 10-2017-0097915 A | 8/2017 |

* cited by examiner

[FIG. 1]
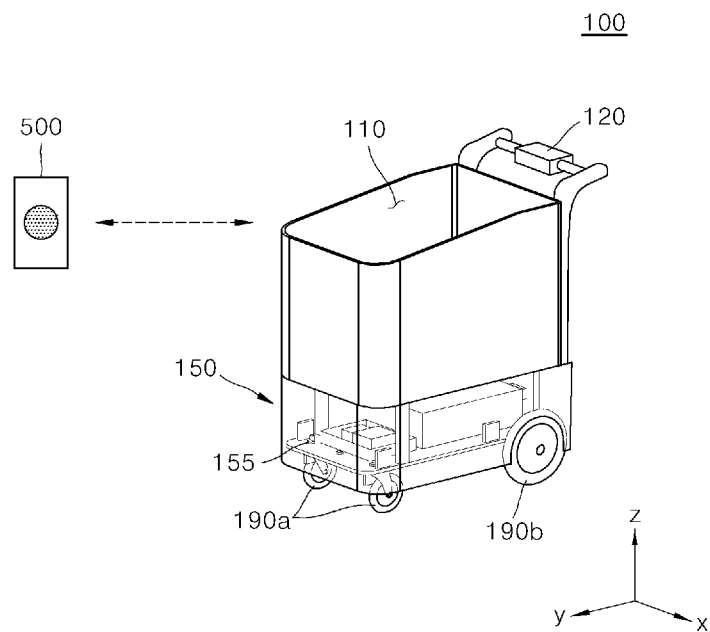

[FIG. 2]
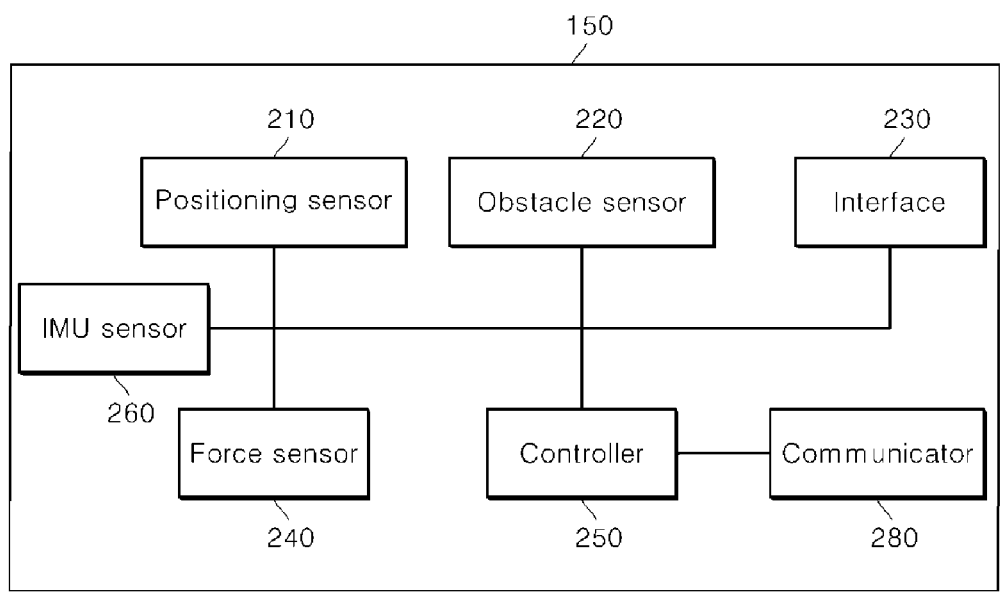

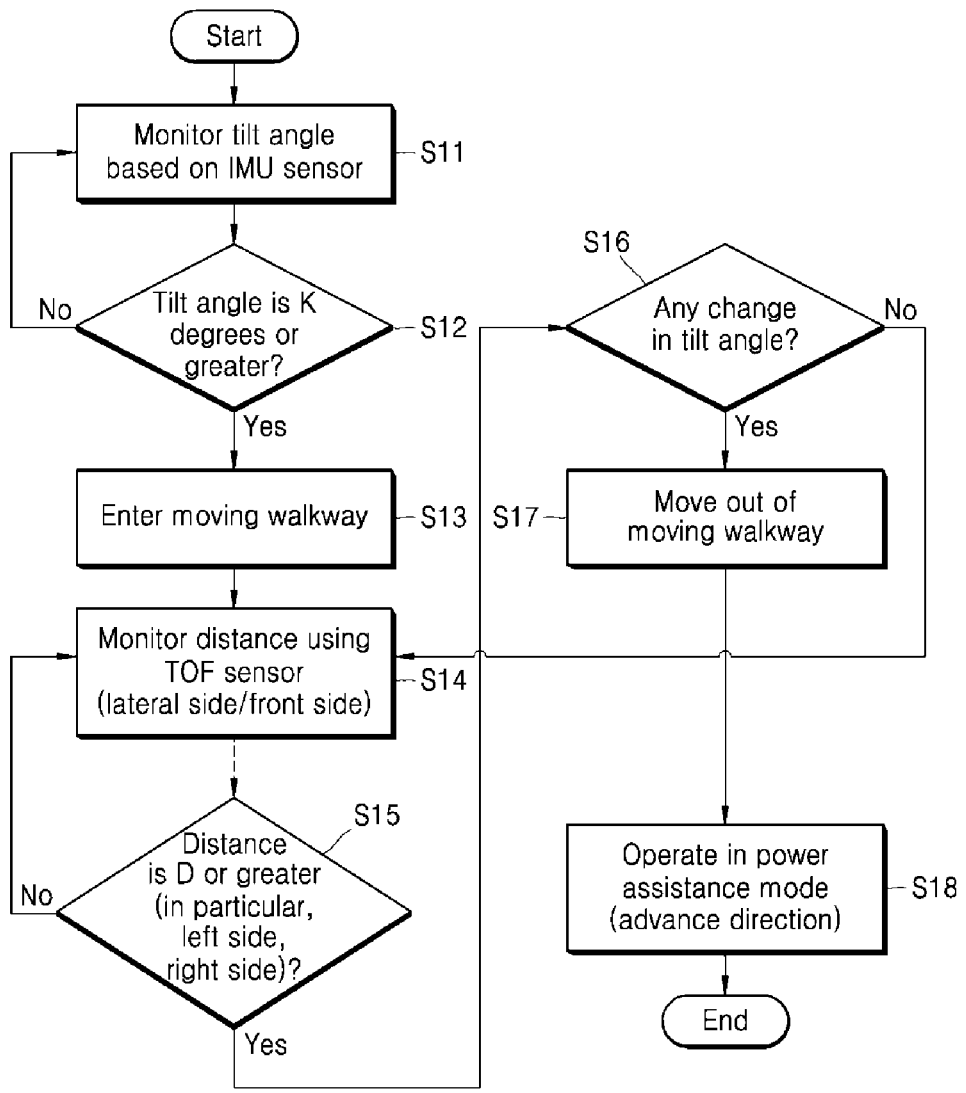
[FIG. 3]

[FIG. 4]
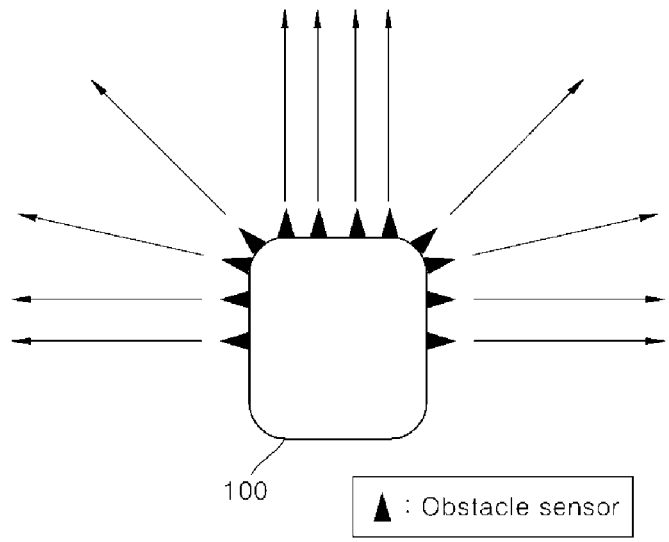
[FIG. 5]
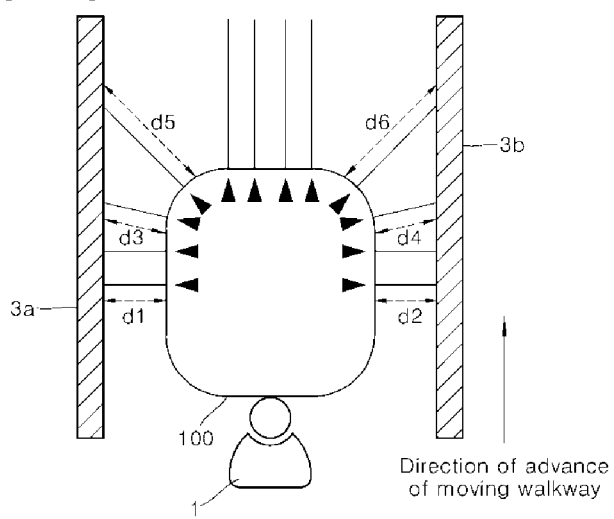

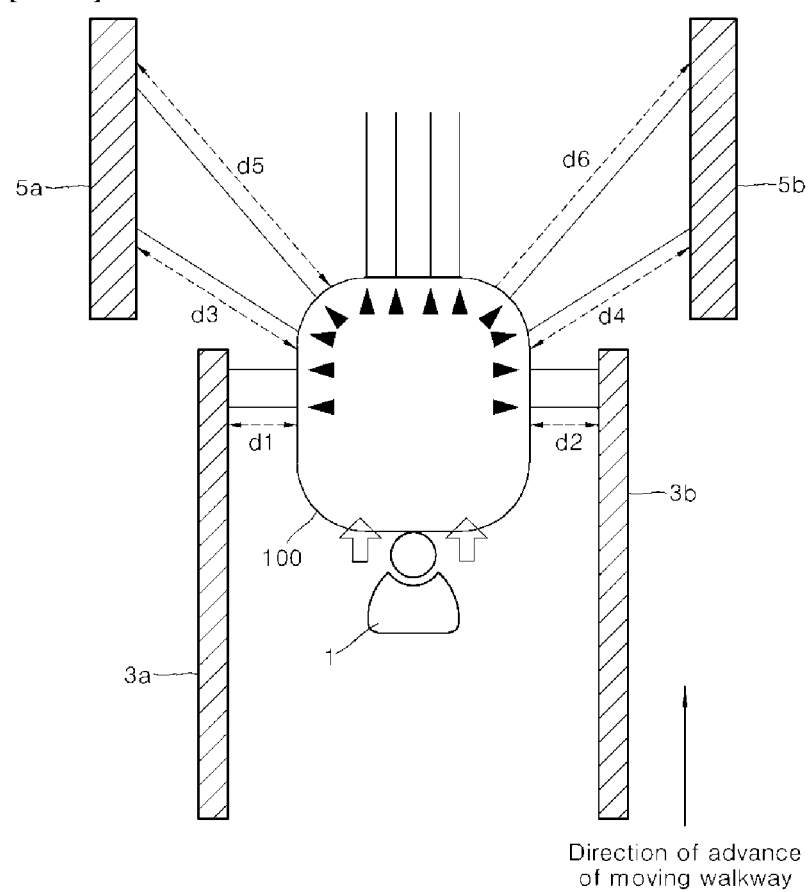

[FIG. 7]
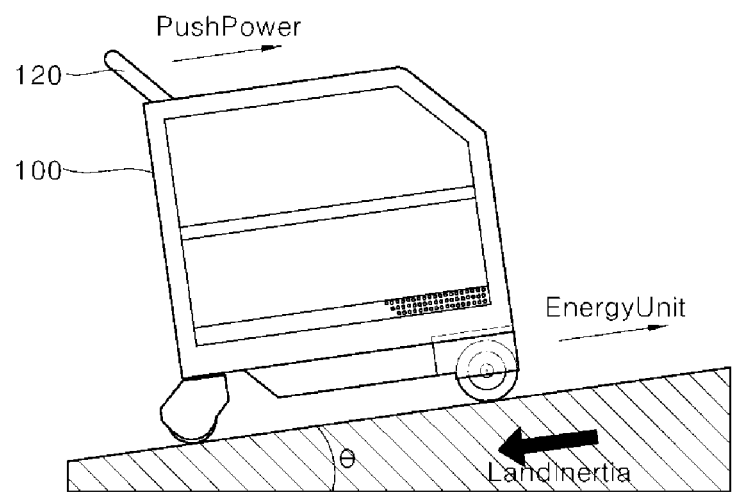
[FIG. 8]
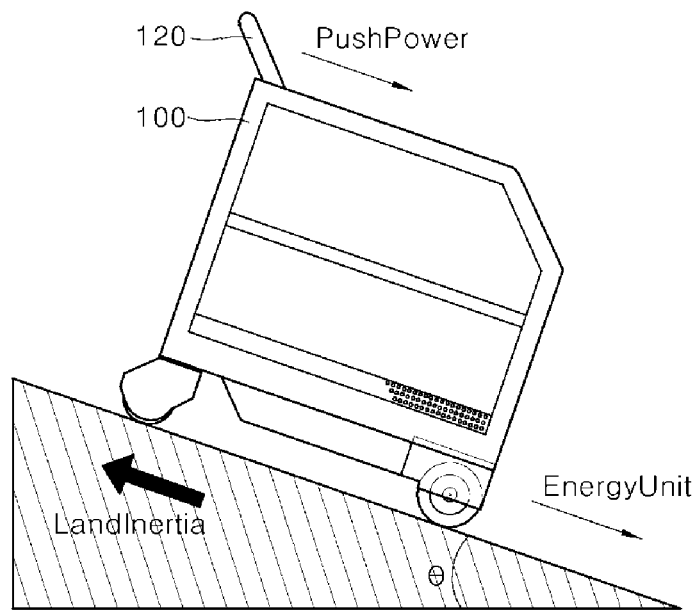

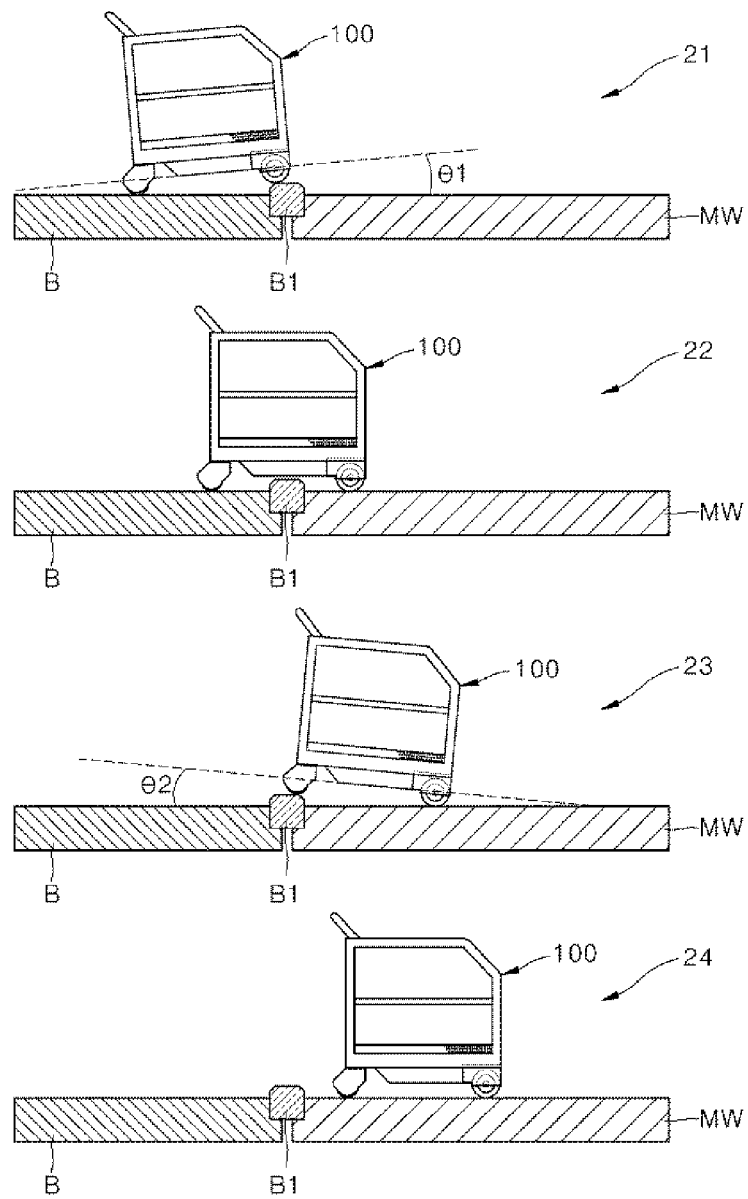
[FIG. 9]

METHOD OF CONTROLLING MOVEMENT OF CART ROBOT IN RESPONSE TO CHANGE IN TRAVEL SURFACE USING ARTIFICIAL INTELLIGENCE AND CART ROBOT IMPLEMENTING THE SAME

CROSS REFERENCE TO RELATED APPLICATIONS

This application is the National Phase of PCT International Application No. PCT/KR2019/004142, filed on Apr. 8, 2019, all of which is hereby expressly incorporated by reference into the present application.

TECHNICAL FIELD

Disclosed herein are a method of controlling movement of a cart robot in response to a change in a travel surface using artificial intelligence and a cart robot implementing the same.

BACKGROUND ART

In spaces such as large-scale marts, department stores, airports, and golf courses and the like in which interactions among people and material exchange actively occur, people move while carrying various objects. In this case, devices such as carts can assist users to carry objects.

In the places, the users usually handle and move the carts on their own. However, when a user checks various articles and makes a payment, the user's cart can hinder passage of another cart. In this situation, time and labor are required for the user to continuously care for the cart.

In order for users to move freely and perform a variety of activities, required are devices such as carts that can move tracking the users without the users' additional control or can move using electric energy under the control of the users. Additionally, the floor of a travel surface on which an autonomous cart or a semi-autonomous cart moves is not uniform. Accordingly, described is a method of controlling carts to allow the carts to move in response to a change in the travel surface in a large space where a variety of installed objects such as a slope or a moving walkway is disposed.

DESCRIPTION OF INVENTION

Technical Problem

To solve the above problems, according to the present disclosure, a cart may be prevented from slipping at a point where a travel surface changes.

To solve the above problems, according to the present disclosure, the cart robot may move without stopping at the point where the travel surface changes to reduce a collision with another cart robot in a space.

According to the present disclosure, the cart robot may ensure improvement in safety and efficiency of movement on a moving walkway while moving under the controller of a user.

Objectives are not limited to the above described objectives, and other objectives and advantages that are not stated above can be clearly understood from the following description and can be more clearly understood from the embodiments set forth herein. It can be easily understood that the objectives and advantages in the disclosure are embodied by means described in the appended claims and combinations thereof.

Technical Solution

In a cart robot of one embodiment controlling movement in response to a change in a travel surface using artificial intelligence, when an IMU sensor senses a change in a travel surface, an obstacle sensor may sense a distance from an installed object placed in a direction of an advance of the cart robot to control a moving part of the cart robot.

The cart robot in one embodiment may increase magnitude of electric energy to be supplied to the moving part at a time point when the travel surface changes and when the cart robot exits from the travel surface.

In the cart robot of one embodiment, when a distance sensed by the obstacle sensor at a front of the cart robot is a predetermined exit distance reference value or greater and a tilt angle of the cart robot decreases after the change in the travel surface caused by the cart robot's entry to a moving walkway, a controller may increase magnitude of electric energy to be supplied to the moving part in proportion to a force sensed by a force sensor.

In the cart robot of one embodiment, when the tilt angle of the cart robot is an angle, at which the cart robot slips, or greater, the cart robot may lock a motor of the moving part.

In the cart robot of one embodiment, the controller may increase magnitude of electric energy to be supplied to the moving part based on a change in a force sensed by the force sensor at a tilt angle that is the angle, at which the cart robot slips, or less on an upward slope.

Advantageous Effect

In embodiments of the disclosure, a cart may be prevented from slipping on a slope or a moving walkway.

In the embodiments, the cart robot may help to reduce the possibility of a collision between the cart robot and another cart robot at a point where a travel surface changes, such as the cart robot's entry to or exit from a slope or a moving walkway.

In the embodiments, the cart robot may ensure improvement in safety and efficiency of movement on a moving walkway while moving under the control of a user.

Effects are not limited to the effects mentioned above, and one having ordinary skill in the art can readily draw various effects from the configurations in the disclosure.

BRIEF DESCRIPTION OF DRAWING

FIG. 1 shows an exterior of a cart robot in one embodiment.

FIG. 2 shows components of a control module of the cart robot in one embodiment.

FIG. 3 shows a process in which the control module in one embodiment ascertains an area in which the cart robot is placed and performs a power assist mode.

FIG. 4 shows a range sensed by obstacle sensors disposed at the cart robot in one embodiment.

FIG. 5 shows a process in which the obstacle sensors of the cart robot sense a moving walkway in the moving walkway in one embodiment.

FIG. 6 shows a range sensed by the obstacle sensors at a point of an exit from a moving walkway in one embodiment.

FIG. 7 shows a process in which the cart robot operates in the power assist mode on an upward slope in one embodiment.

FIG. 8 shows a process in which the cart robot operates in the power assist mode on a downward slope in one embodiment.

FIG. 9 shows a process in which the cart robot enters a parallel moving walkway in one embodiment.

DETAILED DESCRIPTION OF EXEMPLARY EMBODIMENT

Hereinafter, embodiments of the invention will be described in detail with reference to the accompanying drawings such that the invention can be easily implemented by those skilled in the art. The invention can be embodied in various forms and is not limited to the embodiments.

Parts which are not associated with description will be omitted in order to clearly describe the invention, and the same or similar components over the entire specification will be referred to by the same reference signs. Some embodiments of the invention will be described in detail with reference to the accompanying drawings. In the drawings, the same components will be referred to by as the same reference signs as possible. In the following description, when detailed description of the relevant known configurations or functions is determined to obscure the important point of the present disclosure, the detailed description will be omitted.

Terms such as first, second, A, B, (a), and (b) can be used to describe components of the invention. These terms are merely used to distinguish one component from another component and the essence, order, sequence, number, or the like of the components is not limited to the terms. If it is mentioned that a component is "coupled" or "connected" to another component, it should be understood that the component is directly coupled or connected to another component or still another component may "interposed" therebetween or the components may be "coupled" or "connected" to each other with still another component interposed therebetween.

In embodying the invention, components can be segmented and described for the purpose of convenience of explanation, these components may be embodied in one device or module, or one component or may be divided and embodied into two or more devices or modules.

In the following description, devices that move autonomously while tracking users or move using electric energy under the control of users are referred to as smart cart robots, cart robots, or carts. Cart robots can be used in shops such as large-scale marts or department stores and the like. Alternatively, the cart robots can be used in spaces where many trippers move such as airports or harbors. The cart robots can also be used in leisure spaces such as golf courses.

The cart robots include all devices that track a position of a user, follow the user, and have a predetermined storage space. The cart robots include all devices that move using electric power under the control of a user such as a push or a pull. As a result, the user can move a cart robot with no need to control the cart robot. The user can move the cart robot with a very small force.

FIG. 1 shows an exterior of a cart robot in one embodiment. FIG. 2 shows components of a control module 150 of the cart robot in one embodiment. The x, y, and z axes in FIG. 1 illustrate a three-dimensional axis with respect to the cart robot.

A cart robot 100 may include a storage 110, a handle assembly 120, a control module 150, and moving parts 190a and 190b. The storage 110 may be a space in which articles are stored or piled by a user. The handle assembly 120 enables the user to manually control movement of the cart robot 100 or to semi-automatically control movement of the cart robot 100.

The user may push the cart robot 100 back and forth or change a direction thereof using the handle assembly 120. In this case, the cart robot 100 can travel semi-automatically using electric energy based on the magnitude of a force applied to the handle assembly 120 or a difference between a left force and a right force.

The control module 150 may control movement of the cart robot 100. The control module 150 may control an autonomous travel of the cart robot 100 to allow the cart robot to track the user. The control module 150 may control a semi-autonomous travel (power assist) of the cart robot by assisting with the user's force when the user pushes or pulls the cart robot with a small force.

The control module 150 may control the moving part 190. The moving part 190 may move the cart robot along a travel route generated by a controller 250. The moving part 190 may move the cart robot by rotating wheels constituting the moving part 190. In the movement of the cart robot by the moving part 190, the controller 250 may ascertain a position of the cart robot 100 based on the rotation speed, the number of rotations, and the direction and the like of the wheels. The travel route generated by the controller 250 may include angular velocities which are applied to the left wheel and the right wheel of the cart robot.

Positioning sensors that track a position of the user to follow the user may be disposed in various areas of the cart robot 100. Obstacle sensors that sense a nearby obstacle may be disposed in various areas of the cart robot 100. Refer to FIG. 2.

FIG. 2 is a view showing a positioning sensor 210, a force sensor 240, an obstacle sensor 220, an interface 230, a controller 250, an inertial measurement unit (IMU) sensor 260, and a communicator 280 which are logical components constituting the control module 150.

The obstacle sensor 220 may sense an obstacle near the cart robot. The obstacle sensor 220 may sense a distance between the cart robot and a person, a wall, an object, a fixed object, or an installed object, and the like. Alternatively, the obstacle sensor 220 may capture an image of an object/a person/an installed object, and the like near the cart robot. The obstacle sensor 220 may be disposed at a lower end of the cart robot 100.

For example, a plurality of obstacle sensors 220 may be disposed in an area indicated by 155 to sense an obstacle on front/rear/right/left sides of the cart robot. The obstacle sensors 220 may be disposed at the same height at the lower end of the cart robot 100. Alternatively, the obstacle sensors 220 may be disposed in two or more areas at different heights at the lower end of the cart robot 100. The obstacle sensors may be disposed on the front side/both lateral sides of the cart robot in the direction of movement of the cart robot 100. Alternatively, when the cart robot 100 moves backward, the obstacle sensors may be disposed on the front side, the rear side, and both lateral sides of the cart robot.

The positioning sensor 210 is an essential component of the cart robot that assists with an autonomous travel. However, in a cart robot that only assists with a semi-autonomous travel (power assist), the positioning sensor 210 may be selectively provided.

The positioning sensor 210 may track a position of the user who carries a transmitter module 500 and may be disposed at the upper end, or on the lateral sides, and the like of the cart robot 100. However, the positions of these sensors may vary depending on embodiments and may not be limited. Regardless of the positions of the sensors, the control module 150 may control the sensors or use information sensed by the sensors. That is, the sensors may be logical components of the control module 150 regardless of the physical positions thereof.

The positioning sensor 210 may receive a signal from the transmitter module 500 and measure a position of the transmitter module 500. When the positioning sensor 210 uses an ultra-wideband (UWB), the user may carry the transmitter module 500 that transmits a predetermined signal to the positioning sensor 210. The positioning sensor 210 may ascertain the position of the user based on the position of the transmitter module 500. In an example, the user may carry a band-type transmitter module 500 attached onto the user's wrist.

An interface that outputs predetermined information to the user may be disposed in the handle assembly 120, and the interface may be a component controlled by the control module 150. The handle assembly 120 may include the force sensor 240 that senses a force with which the user pushes or pulls the cart robot.

The force sensor 240 may be disposed outside or inside the cart robot 100 subject to a change in a force as a result of manipulation of the handle assembly 120. The position or configuration of the force sensor 240 may vary and the force sensor 240 may not be limited.

The force sensor 240 may be disposed in the handle assembly 120 or outside or inside the cart robot 100 connected to the handle assembly 120. When the user applies a force to the handle assembly 120, the force sensor 240 may sense magnitude of the force, or a change in the force, and the like. The force sensor 240 may include various types of sensors such as a Hall sensor, a magnetic type sensor, a button type sensor and the like. The force sensor 240 may include a left force sensor and a right force sensor respectively disposed in the handle assembly 120 or inside or outside the cart robot 100.

The IMU sensor 260 may determine whether the cart robot 100 tilts. The IMU sensor may sense whether a travel surface of the cart robot changes. The IMU sensor may sense both of the flat surface moving walkway and the slope moving walkway.

On the flat surface moving walkway, the cart robot may tilt within a short period of time as the cart robot enters the moving walkway. The IMU sensor may ascertain that the cart robot has entered the flat surface moving walkway when a tilt angle of the cart robot temporarily increases and then decreases.

When the moving part 190*a* disposed at the front of the cart robot 100 and the moving part 190*b* disposed at the rear of the cart robot 100 are not on a flat surface, the IMU sensor may sense tilt angles of the moving parts at the front and the rear of the cart robot.

The obstacle sensor 220 may sense an obstacle near the cart robot. The obstacle sensor may include a sensor that measures a distance or acquires an image and ascertains an obstacle in the image. An infrared sensor or an ultrasonic sensor, a LIDAR sensor, and the like may be given as examples of the obstacle sensor 220 for measuring a distance.

The obstacle sensor 220 may include a depth sensor or an RGB sensor. The RGB sensor may sense an obstacle and an installed object in an image. The depth sensor may calculate depth information of each point in an image.

The obstacle sensor 220 may include a time-of-flight (TOF) sensor.

The controller 250 may accumulate and store position information of a transmitter module and generate a travel route corresponding to the stored position information of the transmitter module. To accumulate and store the position information, the controller 250 may store the position information of the transmitter module 500 and the cart robot 100 as absolute position information (absolute coordinates) based on a predetermined reference point.

Alternatively, the controller 250 may ascertain whether there is a change in the travel surface and may control movement of the cart robot using the obstacle sensor 220 and the IMU sensor 260.

The controller 250 may control the direction or the speed of movement of the moving part based on the change or the magnitude of a force sensed by the force sensor 240. Alternatively, the controller 250 may control the moving part 190 such that more electric energy is supplied to a motor of the moving part to control the speed of movement.

The controller 250 may sense an installed object near the cart robot using a value sensed by the obstacle sensor 220. The controller 250 may ascertain an installed object using the obstacle sensor 220 disposed on the lateral and front sides of the cart robot.

The obstacle sensor 220 may sense an installed object such as a moving walkway, and the controller 250 may determine whether the cart robot has come into a moving walkway or the cart robot will come out of a moving walkway.

A change in the travel surface denotes a change in the angle of the travel surface, which is caused when the cart robot moves from a flat surface of a travel space to an inclined surface of the travel space or when the cart robot moves from an inclined surface of a travel space to a flat surface of the travel space.

Alternatively, a change in the travel surface denotes a change in the gradient of the floor of the same material and denotes a case in which the cart robot comes into a moving walkway or comes out of a moving walkway. The moving walkway may include a slope moving walkway and a flat surface moving walkway.

Additionally, a change in the travel surface denotes a change in the travel surface causing high resistance against the movement of the cart robot and a change in the travel surface causing low resistance against the movement of the cart robot as well as the entry to a moving walkway. For example, a change in the travel surface may be caused when the cart robot enters an area in which a floor surface is made of a material increasing friction to prevent a cart from slipping.

That is, when the IMU sensor 260 senses a change in the travel surface, the controller 250 may control the obstacle sensor such that the obstacle sensor senses a distance between the cart robot and an installed object placed in a direction of an advance of the cart robot, and may calculate a time point at which the cart robot moves out of the travel surface and increase magnitude of electric energy to be supplied to the moving part 190 at the time point at which the cart robot moves out of the travel surface. In this case, the magnitude of electric energy may increase in proportion to a push force applied by the user to the cart robot.

The controller 250 of the cart robot 100 may be additionally equipped with an artificial intelligence module. When the obstacle sensor 220, the IMU sensor 260 and the like provide a sensed value to the controller 250, the artificial intelligence module in the controller 250 may receive the sensed value and determine whether there is any change in the travel surface. Machine learning or a deep learning network may be an example of the artificial intelligence module.

The controller 250 of the cart robot may perform context awareness using the artificial intelligence module. The controller 250 may recognize a situation of the cart robot 100 based on an input value of the artificial intelligence module such as sensed values, the user's control, or information received from other cart robots or a server, and the like.

Additionally, the controller 250 of the cart robot may read pieces of input image information using the artificial intelligence module. That is, the controller 250 may perform image processing.

The artificial intelligence module may include an inference engine, a neural network and a probability model. Additionally, the artificial intelligence module may perform supervised learning or unsupervised learning based on various types of data.

Further, the artificial intelligence module may perform natural language processing to recognize the voice of the user and extract information from the voice.

The controller 250 of the cart robot 100 may provide the functions of voice recognition and text to speech.

Hereunder, a process of controlling a speed or a direction of movement of the cart robot is described when the cart robot comes into or comes out of an inclined surface moving walkway or a flat surface moving walkway and the like.

FIG. 3 shows a process in which the control module in one embodiment ascertains an area in which the cart robot is placed and performs a power assist mode.

In FIG. 3, the controller 250 may calculate a tilt angle using the IMU sensor 260. When the tilt angle is a + value or a − value or when the tilt angle is repeatedly calculated as a + value and a − value, the controller 250 may ascertain that there is a change in the travel surface.

The controller 250 may monitor a tilt angle through the IMU sensor 260 (S11). In an example, the IMU sensor 260 may sense a gradient of the cart robot, which is caused by a difference in heights of the moving part 190a at the front of the cart robot and the moving part 190b at the rear of the cart robot.

When the tilt angle is K degrees or greater (S12), the controller 250 may ascertain the cart robot's entry to the inclined surface moving walkway (S13). Herein, K degrees denotes a minimum angle used for ascertaining a slope. For example, the minimum reference angle, e.g., 3 degrees or 5 degrees, is used for ascertaining an inclined surface.

When the tilt angle is K degrees or greater, the controller 250 may ascertain the cart robot's entry to the inclined surface. In this case, the controller 250 may turn on an additional inclined surface entry flag.

The K degrees may be determined based on an absolute value of slope. Accordingly, the controller 250 may change a tilt angle calculated as an upward gradient or a downward gradient into an absolute value and compare the absolute value with K degrees.

Then the controller 250 may monitor a distance between the cart robot and an obstacle using the obstacle sensors, e.g., a TOF sensor, on the lateral and front sides of the cart robot (S14).

When the distance between the cart robot and the obstacle is a exit distance reference value D or greater as a result of monitoring, the controller 250 may check a change in a tilt angle to further ascertain whether the cart robot does not sense the left/right guideline of the moving walkway (S16).

When there is a change in the tilt angle, i.e., when an angle of a previously maintained gradient of the cart robot changes because of the cart robot's exit from the moving walkway (S16), the controller 250 may ascertain that the cart robot will move out of the moving walkway (S17). Then the controller 250 may operate in a power assist mode to increase a speed of movement of the cart robot.

That is, when a distance sensed by the obstacle sensor at the front of the cart robot is a predetermined exit distance reference value or greater and the tilt angle of the cart robot decreases, the controller 250 may increase magnitude of electric energy to be supplied to the moving part 190 in proportion to a force sensed by the force sensor 250.

Suppose that a force applied to the handle assembly is 1 and a speed of movement corresponding to the force is 1. At a time point when the cart robot moves out of the moving walkway, the controller 250 may increase the speed of movement of the cart robot to 1.5.

Alternatively, at a time point when the cart robot moves out of an upward slope moving walkway, the controller 250 may increase the speed of movement of the cart robot to 1.7.

At a time point when the cart robot moves out of a downward slope moving walkway, the controller 250 may increase the speed of movement of the cart robot to 1.3. This indicates that the controller 250 differently adjusts the speed of movement of the cart robot while performing the power assist mode on the upward and downward slopes.

The controller 250 may ascertain that the cart robot will not move out of the moving walkway when the cart robot becomes far from the left/right side or from the front with no change in the tilt angle in step 15.

In FIG. 3, a left/right side obstacle sensor may continue to sense a constant distance when the cart robot enters the moving walkway. Obstacle sensors on the left and right of the front of the cart robot may continue to sense an installed guide object on the left/right of the moving walkway, and at a time point when the installed guide objects are removed, the controller 250 may ascertain the cart robot's exit from the moving walkway.

Thus, the controller 250 may exactly ascertain the time point when the cart robot moves out of the moving walkway using artificial intelligence and provide the power assist mode to allow the user to readily push the cart robot when the user moves out of the moving walkway.

Referring to the embodiment in FIG. 3, the IMU sensor 260 of the cart robot 100 may sense a tilt angle in the heightwise direction z. The IMU sensor 260 or the controller 250 may also calculate magnitude of an angle.

Additionally, the controller 250 may ascertain that the cart robot is placed in the middle of the moving walkway and in the end portion of the moving walkway to move out of the moving walkway, through the obstacle sensors (e.g., a TOF sensor) on the lateral and front sides of the cart robot. Description in relation to this is provided below with reference to FIGS. 3 to 5.

The controller 250 may accumulate and store values sensed by the IMU sensor 260 of the cart robot, and when a gradient of the cart robot becomes smooth, i.e., when a tilt angle of the cart robot becomes small, may ascertain that the cart robot moves out of the end portion of the moving walkway.

During the process, to improve accuracy, the controller 250 may accumulate and store sensing values of installed objects on the left and right sides of the moving walkway using the obstacle sensors, and when a distance value sensed by the obstacle sensor suddenly increases, may ascertain a state in which the cart robot 100 moves out of the moving walkway.

In this case, to prevent the cart robot 100 from slipping, having held or having locked the motor to stop driving of the motor, the controller 250 may unhold or unlock the motor and perform the power assist mode in the direction in which the cart robot advances, to prevent the cart robot 100 from moving backward on the moving walkway.

FIG. 4 shows a range sensed by obstacle sensors disposed at the cart robot in one embodiment. A plurality of obstacle sensors may be arranged on the left, right and front sides and on the left and right of the front of the cart robot. Directions sensed by the obstacle sensors are indicated by solid line arrows.

FIG. 5 shows a process in which the obstacle sensors of the cart robot sense a moving walkway in the moving walkway in one embodiment.

FIG. 5 shows a user 1 moving the cart robot on the moving walkway. The obstacles sensors, e.g., TOF sensors, disposed on the lateral and front sides of the cart robot 100, may sense the left and right sides, and the guidelines of the moving walkway on left and right front sides. Another user or another cart robot may be placed in front of the cart robot.

The controller 250 may ascertain that the cart robot keeps a constant distance from an obstacle sensed by the obstacle sensors on both sides.

For example, the controller 250 may continue to store a distance d1 from a guideline 3a of the moving walkway, sensed by the obstacle sensors on the left side of the cart robot, and a distance d2 from a guideline 3b of the moving walkway, sensed by the obstacle sensors on the right front side of the cart robot, to ascertain an increase and a decrease in the sensed distances.

The controller 250 may continue to store distances d3, d5 from the guideline 3a of the moving walkway, sensed by the obstacle sensors on the left front side of the cart robot, and distances d4, d6 from the guideline 3b of the moving walkway, sensed by the obstacle sensors on the right of the front of the cart robot, to ascertain an increase and a decrease in the sensed distances.

In the state of FIG. 5, the controller 250 may ascertain that the cart robot has entered the moving walkway when the distances from the objects 3a, 3b on both sides are constant. The controller 250 may lock the motor of the moving part 190 temporarily to prevent the cart robot from moving. Accordingly, the cart robot may not move without predetermined magnitude of an external force.

When the cart robot 100 tilts at a predetermined tilt angle or greater on a slope, the controller 250 may fix the cart robot to prevent the cart robot 100 from slipping.

However, when the user pushes or pulls the cart robot freely, the cart robot may move under the control of the user. To this end, the controller may implement a power assist mode as follows. In an example of the power assist mode, the controller 250 may increase or decrease magnitude of electric energy to be supplied to the moving part 190.

In summary, when ascertaining that the tilt angle of the cart robot, sensed by the IMU sensor 260, remains constant and that a value (a distance from an obstacle) measured by the obstacle sensors on the lateral sides is within a predetermined range of values, the controller 250 may ascertain that the cart robot is in the middle of the moving walkway.

FIG. 6 shows a range sensed by the obstacle sensors at a point of exit from a moving walkway in one embodiment. In FIG. 6, the distances d3/d5 from an obstacle, sensed on the left front side, increase at a time point when the moving walkway 3a, 3b ends since the distances from the obstacle increase as a result of sensing of an outer wall 5a by the obstacle sensors on the left front side of the cart robot.

Additionally, in FIG. 6, the distances d4/d6 from an obstacle, sensed on the right front side, increase at the time point when the moving walkway 3a, 3b ends since the distances from the obstacle increase as a result of sensing of an outer wall 5b by the obstacle sensors on the right front side of the cart robot.

When the distances sensed by the obstacle sensors, configured to sense a distance from obstacles on the left and right front sides, rapidly increase unlike the distances in FIG. 5, the controller 250 may ascertain a point where the cart robot moves out of the moving walkway.

Then when the user pushes the cart robot 100, the controller 250 may control the moving part 190 to increase a speed of movement of the cart robot in a direction of an advance of the moving walkway. As a result, the cart robot 100 may move out of the moving walkway in the power assist mode.

Referring to the above embodiment, the controller 250 may control the cart robot to prevent the cart robot from sliding due to a slope when the cart robot comes in/comes out of a slope moving walkway and the like.

When the cart robot moves out of the moving walkway, the controller 250 may monitor the exit of the cart robot and supply more electric energy to the moving part without large magnitude of force applied by the user to push the cart robot that is heavy. As a result, the user may readily control the cart robot and the cart robot may easily move out of the slope.

FIG. 7 shows a process in which the cart robot operates in the power assist mode on an upward slope in one embodiment. The IMU sensor 260 may sense a tilt angle.

A push force applied by the user to the handle assembly 120 is referred to as PushPower. Magnitude of electric energy, to be supplied to the motor of the moving part 190 by the controller 250 for the power assist mode, is referred to as EnergyUnit (for short, E_Unit). A tilt angle of the cart robot 100 with respect to the floor is referred to as θ.

In this case, the controller 250 may calculate EnergyUnit using a function below.

In the case of an upward slope, the controller 250 may calculate magnitude of electric energy to be supplied to the motor of the moving part 190 using an Upward function. Upward may calculate a value proportional to PushPower and θ. LandInertia denotes a degree to which an uneven floor surface or features of a material of a floor surface interfere with the movement of the cart robot. Since the moving walkway ordinarily has a floor surface interfering with the movement of the cart robot, LandInertia may increase.

The controller 250 may calculate magnitude of electric energy to be supplied to the motor of the moving part 190 using the Upward function and primarily calculate a speed of movement of the cart robot, and when the speed of movement is less than an expected speed, may increase a LandInertia value and recalculate magnitude of electric energy to be supplied to the motor of the moving part 190. The LandInertia value may be previously set in an initial stage.

$$EnergyUnit=Upward(PushPower,\theta)+LandInertia$$

Thus, the controller 250 may calculate magnitude of electric energy to be supplied to the motor of the moving part 190 in proportion to a gradient of an upward slope, and supply the calculated magnitude of energy to the motor. The user may control the cart robot 100 such that the cart robot easily moves even on an upward slope while pushing the cart robot with the same magnitude of force on an upward slope as well as a flat surface.

In FIG. 7, in a gradient of an upward slope, where the cart robot can be pushed and pulled, e.g., at a tilt angle of an upward slope, which is an angle, at which the cart robot slips, or less, the controller 250 may control to increase the magnitude of electric energy to be supplied to the moving part depending on a change in force sensed by the force sensor 240.

FIG. 8 shows a process in which the cart robot operates in the power assist mode on a downward slope in one embodiment. The IMU sensor 260 may sense a tilt angle.

A tilt angle of the cart robot 100 with respect to the floor is referred to as θ. In this case, the controller 250 may calculate EnergyUnit using a function below.

In the case of a downward slope, the controller 250 may calculate magnitude of electric energy to be supplied to the motor of the moving part 190 using a Downward function. Downward may calculate a value proportional to PushPower and inversely proportional to θ.

The controller 250 may apply a LandInertia value to such a degree that the movement of the cart root is interrupted by an uneven floor surface. When a speed of movement of the cart robot is less than an expected speed, the controller may increase the LandInertia value and recalculate magnitude of electric energy to be supplied to the motor of the moving part 190.

$$\text{EnergyUnit}=\text{Downward}(\text{PushPower},\theta)+\text{LandInertia}$$

Thus, the controller 250 may calculate magnitude of electric energy to be supplied to the motor of the moving part 190 in inverse proportion to a gradient of a downward slope, and supply the calculated magnitude of energy to the motor. Since the cart robot may suddenly move downward on the downward slope, electric energy having magnitude smaller than magnitude of electric energy on a flat surface may be supplied to the cart robot. As a result, the user may control the cart robot safely on the downward slope.

The controller 250 may increase or decrease LandInertia based on PushPower supplied to the cart robot and the speed of movement of the cart robot. The controller 250 may readjust LandInertia when the speed of movement of the cart robot is greater or less than PushPower after supply of EnergyUnit, i.e., tilt angle-based electric energy, to the moving part 190, through Upward/Downward.

In FIG. 8, when a tilt angle is an angle at which the cart robot slips or less and the cart robot is on a downward slope, the controller 250 may to decrease magnitude of electric energy to be supplied to the moving part 190 based on a change in force sensed by the force sensor 240.

In a non-power assist mode, when the user applies force of 5, the speed of movement of the cart robot is 10 cm/sec, and when the user applies force of 10, the speed of movement of the cart robot is 20 cm/sec. On an upward slope, magnitude of force (EnergyUnit or E_Unit) to be applied may increase such that the speed remains the same as the speed on a flat surface.

TABLE 1

| Force applied by user (PushPower) | EnergyUnit applied on flat surface in power assist mode | EnergyUnit applied on upward slope in power assist mode | EnergyUnit applied on downward slope in power assist mode |
|---|---|---|---|
| 5 | 30 E_Unit | 45 E_Unit | 25 E_Unit |
| 10 | 50 E_Unit | 55 E_Unit | 45 E_Unit |

As shown in Table 1, when the user applies force of 5 to the handle assembly, the controller 250 may supply electric energy of 30 EnergyUnit to the moving part 190 to operate in the power assist mode on the flat surface. When the user applies force of 10 to the handle assembly, the controller 250 may supply electric energy of 50 EnergyUnit to the moving part 190 to operate in the power assist mode on the flat surface.

When the user applies force of 5 to the handle assembly on the upward slope in the power assist mode, the controller 250 may supply electric energy of 45 EnergyUnit to the moving part 190. Since the cart robot 100 requires more power to climb the upward slope, the controller 250 may supply more electric energy to the moving part 190 while the user maintains force of 5.

As a result, the user may readily move the cart robot on the upward slope as the user does on the flat surface. When the user applies force of 10, the controller 250 may supply electric energy of 55 EnergyUnit to the moving part 190 on the upward slope.

To prevent the cart robot from quickly moving downward on the downward slope in the power assist mode, the controller 250 may supply electric energy, smaller than electric energy on the flat surface, to the cart robot.

When the user applies force of 5 to the handle assembly on the downward slope in the power assist mode, the controller 250 may supply electric energy of 25 EnergyUnit to the moving part 190. Since the cart robot 100 requires less power to move down the downward slope, the controller 250 may supply less electric energy to the moving part 190 while the user maintains force of 5.

As a result, the user may readily move the cart robot on the downward slope as the user does on the flat surface without causing a quick movement of the cart robot. When the user applies force of 10 on the downward slope, the controller 250 may supply electric energy of 45 EnergyUnit to the moving part 190.

Table 1 may summarize as follows.

The controller 250 may calculate electric energy to be supplied to the moving part in response to force sensed by the force sensor. The electric energy supplied to the moving part may be used to move the cart robot. Thus, the user may move the cart robot with a small force.

As shown in Table 1, the controller 250 may calculate electric energy E1 to be supplied to the moving part 190 in proportion to a first value sensed by the force sensor 240 on the flat surface. The controller 250 may calculate electric energy E2 to be supplied to the moving part 190 in proportion to the same first value sensed by the force sensor 240 on the upward slope. Additionally, the controller 250 may calculate electric energy E3 to be supplied to the moving part 190 in proportion to the same first value sensed by the force sensor 240 on the downward slope.

In this case, a relationship among E1, E2 and E3 satisfies "E3<E1<E2".

For example, the controller 250, as shown in Table 1, may calculate electric energy of 30 EnergyUnit on the flat surface, 45 EnergyUnit on the upward slope, and 25 EnergyUnit on the downward slope with respect to the same force of 5 sensed by the force sensor.

Additionally, E2 and E3 may differ depending on a tilt angle. For example, the controller 250 may increase E2 as an angle of the upward slope increases. As the angle of the upward slope increases, the cart robot requires more energy to move.

The controller 250 may decrease E3 as an angle of the downward slope increases. As the angle of the downward slope increases, the cart robot requires less energy to move.

When the angle of the upward slope or the downward slope is the angle at which the cart robot moves backward or greater, the controller 250 may lock the cart robot to prevent the cart robot from moving.

The process, in which the cart robot operates in the power assist mode based on tilt angles, is described with reference to FIGS. 7 and 8. When the tilt angle is a predetermined angle or greater (e.g., 10 degrees or greater or 15 degrees or greater), the cart robot may slip. The controller 250 may lock the motor based on the tilt angle of the cart robot to prevent the cart robot from moving on the moving walkway. When the motor is locked, the controller 250 may control the cart robot such that the cart robot can stop and cannot move at all. Alternatively, the controller 250 may control the cart robot such that the cart robot can move only when the force sensor 240 senses a strong force.

When the gradient of the cart robot is a predetermined angle, at which the cart robot slips, or greater, the controller 250 may lock the motor of the moving part 190. Additionally, when a minimum force sensed by the force sensor 240 is PushPower=2 in moving the cart robot on the flat surface, the controller 250 may lock the motor, and when the magnitude of force (PushPower) sensed by the force sensor 240 is 4, the controller may unlock the motor to allow the cart robot 100 to move.

When the cart robot moves out of the moving walkway in a state in which the motor is locked, the controller 250 may unlock the motor and increase magnitude of electric energy to be supplied to the moving part of the cart robot.

When the user pushes up the handle assembly in the middle of the moving walkway at a tilt angle that is a predetermined angle or less (e.g., 10 degrees or less, i.e., an angle, at which the cart robot slips, or less), as shown in Table 1, the controller 250 may implement the power assist mode in an upward direction. Likewise, the controller may also implement the power assist mode in a downward direction.

The controller 250 may control a forward power assist in the case of an upward moving walkway and a rearward power assist in the case of a downward moving walkway to enable a fine adjustment in the moving walkway.

FIG. 9 shows a process in which the cart robot enters a parallel moving walkway in one embodiment.

The cart robot 100 may travel a flat surface B and then enter the parallel moving walkway MW as indicated by 21. In this case, the front wheels of the cart robot 100 may go up (or go down) at a boundary B1 between the flat surface B and the parallel moving walkway MW. As a result, the IMU sensor 260 of the cart robot 100 may sense the cart robot 100 tilting by θ1.

Then the cart robot 100 may become horizontal while moving forward, as indicated by 22. Then the rear wheels of the cart robot 100 may go on (or go down) at the boundary B1 between the flat surface B and the parallel moving walkway MW as indicated by 23. As the cart robot 100 enters the parallel moving walkway MW completely, the cart robot 100 may remain horizontal again as indicated by 24.

Accordingly, the controller 250 may ascertain a change in the travel surface during the process in which the IMU sensor 260 senses inclination-horizontality-inclination-horizontality. In particular, after entering the flat surface moving walkway, the cart robot 100 may maintain a horizontal state. As the IMU sensor 260 senses the gradients of the cart robot 100 as indicated by 21, 22, 23 and 24, the controller 250 may ascertain that the cart robot 260's entry to the flat surface moving walkway and monitor the cart robot's exit from the moving walkway.

That is, as the IMU sensor 260 senses inclination and then horizontality, the controller 250 may ascertain that the cart robot 100 has enters the flat surface moving walkway and the travel surface has changed, using the obstacle sensor 220.

To improve accuracy, the IMU sensor 260 may check a first gradient θ1 at a first time point (indicated by 21), and a second gradient θ2 at a second time point (indicated by 23).

When magnitude of an absolute value of the first gradient θ1 and magnitude of an absolute value of the second gradient θ2 are the same within an error range, the IMU sensor 260 may inform the controller 250 that the IMU sensor 260 senses inclination and then horizontality. In response, the controller 250 may ascertain the cart robot's entry to the horizontal moving walkway.

Being the same within the error range denotes little difference between the two values. For example, the first gradient is 12 degrees and the second gradient is 12.5 degrees. The controller 250 may set the error range to 1 degree, 2 degrees and the like.

The controller 250 may determine whether an installed object (a guideline) of the moving walkway is disposed near the cart robot using the obstacle sensors 220 to improve accuracy. As the obstacle sensors 220 on the left and right of the cart robot continue to sense an obstacle on the left and right sides at a constant distance, the controller 250 may ascertain that the cart robot 100 is in the moving walkway.

In this case, the cart robot 100 moves out of the flat surface moving walkway unlike FIG. 3, the gradient of the cart robot 100 may change to inclination-horizontality-inclination-horizontality as in FIG. 9. When distances from the obstacles sensed by the obstacle sensors 220 suddenly increase as illustrated in FIG. 6, the controller 250 may increase magnitude of electric energy to be supplied to the moving part 190.

Alternatively, when the front wheels of the cart robot 100 are inclined and then remain horizontal, the controller 250 may increase magnitude of electric energy to be supplied to the moving part 190 such that rear wheels of the cart robot easily move out of the flat surface moving walkway MW.

The cart robot 100 in the above embodiment may automatically sense a gradient of a moving walkway or a difference in the materials of travel surfaces and the like and may prevent a cart from slipping on a slope. Additionally, the cart robot 100 may sense entry to and exit from a moving walkway and automatically operate in a power assist mode, to enable a user to control the cart robot with a small force at the end of a slope or a exit point of the moving walkway where a travel surface changes.

To sense the entry to and exit from the moving walkway, the cart robot 100 may sense entry to and an exit from a slope moving walkway using the IMU sensor 260. Additionally, the cart robot 100 may sense entry to and an exit from a flat surface moving walkway using the IMU sensor 260.

Further, the cart robot 100 may sense an installed object (e.g., a guideline, a guide rail and the like) on the left and right sides of the moving walkway using the obstacle sensor 220, in particular, a TOF sensor. The cart robot 100 may ascertain a period for which a distance from the installed object sensed is maintained or a time point at which the distance increases and the like to determine whether the cart robot comes into and out of the moving walkway.

At the time point when the cart robot moves out of the moving walkway, the cart robot 100 may operate in the power assist mode or may increase magnitude of electric energy to be supplied in the power assist mode, to enable the cart robot 100 to easily move out of the moving walkway.

Furthermore, based on a gradient, the cart robot 100 may lock the motor in the moving walkway or operate in the power assist mode to prevent a cart from moving backward.

When all elements of the embodiments of the invention are described to be combined into one element or to operate in combination, the invention is not limited to the embodiments and all the elements may be selectively combined to operate within the scope of the invention. All the elements may be embodied can be embodied as independent hardware pieces, respectively, or some or all of the elements may be selectively combined and may be embodied as a computer program including a program module that performs some or all functions combined into one or more hardware pieces. Codes or code segments of the computer program can be easily inferred by those skilled in the art. The computer program can be stored in a computer-readable recording medium and can be read and executed by a computer, whereby the embodiments of the invention can be realized. Examples of a storage medium having stored the computer program include storage mediums such as a magnetic recording medium, an optical recording medium, and a semiconductor recording medium. The computer program for realizing the embodiments of the invention includes a program module which is transmitted via an external device in real time.

While embodiments of the invention have been described above, various changes or modifications can be made thereon by those skilled in the art. Accordingly, it should be understood that such changes and modifications belong to the scope of the invention without departing from the scope of the invention.

The invention claimed is:

1. A cart robot for controlling movement in response to a change in a travel surface using artificial intelligence, the cart robot comprising:
    a plurality of moving parts configured to move the cart robot;
    an obstacle sensor configured to sense an obstacle near the cart robot;
    an inertial measurement unit (IMU) sensor configured to sense the change in the travel surface of the cart robot;
    a force sensor configured to sense a change in force applied to a handle assembly of the cart robot; and
    a controller configured to control a direction or a speed of movement of the plurality of moving parts depending on the change in the force sensed by the force sensor,
    wherein when the IMU sensor senses the change in the travel surface, the controller controls the obstacle sensor such that the obstacle sensor senses a distance from an installed object placed in a direction in which the cart robot advances, calculates a time point at which the cart robot moves out of the travel surface and increases magnitude of electric energy to be supplied to the plurality of moving parts at the time point at which the cart robot moves out of the travel surface,
    wherein the change in the travel surface is caused by the cart robot's entry to a moving walkway,
    wherein the IMU sensor senses a gradient of the cart robot, caused by a difference between heights of a moving part at a front and a moving part at a rear of the cart robot, after the change in the travel surface, and
    wherein when the distance sensed by the obstacle sensor at a front of the cart robot is a predetermined exit distance reference value or greater, and a tilt angle of the cart robot decreases, the controller increases the magnitude of the electric energy to be supplied to the plurality of moving parts in proportion to the force sensed by the force sensor.

2. The cart robot of claim 1, wherein when the tilt angle is an angle, at which the cart robot slips, or greater, the controller locks a motor of the plurality of moving parts, and
    wherein the controller unlocks the motor before increasing the magnitude of the electric energy to be supplied to the plurality of moving parts of the cart robot.

3. The cart robot of claim 1, wherein when the tilt angle is an angle, at which the cart robot slips, or less on an upward slope, the controller increases the magnitude of the electric energy to be supplied to the plurality of moving parts based on the change in the force sensed by the force sensor.

4. The cart robot of claim 1, wherein when the tilt angle is an angle, at which the cart robot slips, or less on a downward slope, the controller decreases the magnitude of the electric energy to be supplied to the plurality of moving parts based on the change in the force sensed by the force sensor.

5. The cart robot of claim 1, wherein the controller calculates electric energy E1 to be supplied to the plurality of moving parts in proportion to a first value sensed by the force sensor on a flat surface,
    wherein the controller calculates electric energy E2 to be supplied to the plurality of moving parts in proportion to the first value sensed by the force sensor on an upward slope,
    wherein the controller calculates electric energy E3 to be supplied to the plurality of moving parts in proportion to the first value sensed by the force sensor on a downward slope, and
    wherein a relationship among E1, E2 and E3 satisfies "E3<E1<E2".

6. The cart robot of claim 5, wherein the controller increases the E2 when an angle of the upward slope increases, and
    wherein the controller decreases the E3 when an angle of the downward slope increases.

7. The cart robot of claim 1, further comprising a positioning sensor configured to track a position of a user.

8. A cart robot for controlling movement in response to a change in a travel surface using artificial intelligence, the cart robot comprising:
    a plurality of moving parts configured to move the cart robot;
    an obstacle sensor configured to sense an obstacle near the cart robot;
    an inertial measurement unit (IMU) sensor configured to sense the change in the travel surface of the cart robot;
    a force sensor configured to sense a change in force applied to a handle assembly of the cart robot; and
    a controller configured to control a direction or a speed of movement of the plurality of moving parts depending on the change in the force sensed by the force sensor,
    wherein when the IMU sensor senses the change in the travel surface, the controller controls the obstacle sensor such that the obstacle sensor senses a distance from an installed object placed in a direction in which the cart robot advances, calculates a time point at which the cart robot moves out of the travel surface and increases magnitude of electric energy to be supplied to the plurality of moving parts at the time point at which the cart robot moves out of the travel surface, and wherein in sensing the change in the travel surface, when the IMU sensor senses inclination and then horizontality, the controller ascertains that the cart robot enters a flat surface moving walkway and ascertains the change in the travel surface, using the obstacle sensor.

9. The cart robot of claim 8, wherein the IMU sensor checks a first gradient at a first time point and a second gradient at a second time point, and wherein when magnitude of an absolute value of the first gradient and magnitude of an absolute value of the second gradient are the same within an error range, the IMU sensor informs the controller that the IMU sensor senses the inclination and then the horizontality.

10. A method of controlling movement of a cart robot in response to a change in a travel surface using artificial intelligence, the method comprising:

sensing the change in the travel surface of the cart robot by an inertial measurement unit (IMU) sensor of the cart robot;

sensing a distance from an installed object placed in a direction of an advance of the cart robot by an obstacle sensor of the cart robot;

calculating a time point of the cart robot's exit from the travel surface by a controller of the cart robot;

increasing magnitude of electric energy to be supplied to a plurality of moving parts of the cart robot by the controller at the time point of the cart robot's exit from the travel surface;

sensing a gradient of the cart robot, caused by a difference between heights of a moving part at a front and a moving part at a rear of the cart robot by the IMU sensor; and when the distance sensed by the obstacle sensor at a front of the cart robot is a predetermined exit distance reference value or greater, and a tilt angle of the cart robot decreases, increasing the magnitude of the electric energy to be supplied to the plurality of moving parts by the controller in proportion to force sensed by a force sensor.

11. The method of claim 10, further comprising:

when the tilt angle is an angle, at which the cart robot slips, or greater, locking a motor of the plurality of moving parts by the controller; and unlocking the motor by the controller before increasing the magnitude of the electric energy to be supplied to the plurality of moving parts of the cart robot.

12. The method of claim 10, further comprising:

increasing the magnitude of the electric energy to be supplied to the plurality of moving parts by the controller, based on a change in the force sensed by the force sensor, when the tilt angle is an angle, at which the cart robot slips, or less on an upward slope.

13. The method of claim 10, further comprising:

decreasing the magnitude of the electric energy to be supplied to the plurality of moving parts by the controller based on the change in the force sensed by the force sensor, when the tilt angle is an angle, at which the cart robot slips, or less on a downward slope.

14. The method of claim 10, further comprising: any one of calculating electric energy E1 to be supplied to the plurality of moving parts by the controller in proportion to a first value sensed by the force sensor on a flat surface; or calculating electric energy E2 to be supplied to the plurality of moving parts by the controller in proportion to the first value sensed by the force sensor on an upward slope; or calculating electric energy E3 to be supplied to the plurality of moving parts by the controller in proportion to the first value sensed by the force sensor on a downward slope, wherein a relationship among E1, E2 and E3 satisfies "E3<E1<E2".

15. The method of claim 14, further comprising: any one of increasing the E2 by the controller when an angle of the upward slope increases; or decreasing the E3 by the controller when an angle of the downward slope increases.

16. The method of claim 10, wherein the sensing the change in the travel surface comprises:

sensing inclination and then horizontality by the IMU sensor; and ascertaining that the cart robot enters a flat surface moving walkway and ascertaining the change in the travel surface, by the controller, using the obstacle sensor.

17. The method of claim 16, further comprising:

informing the controller that the IMU sensor senses the inclination and then the horizontality by the IMU sensor when the IMU sensor checks a first gradient at a first time point and a second gradient at a second time point, and magnitude of an absolute value of the first gradient and magnitude of an absolute value of the second gradient are the same within an error range.

* * * * *